US008827343B2

(12) United States Patent
Peters

(10) Patent No.: US 8,827,343 B2
(45) Date of Patent: Sep. 9, 2014

(54) RAMP STORAGE CASE ASSEMBLY FOR PICKUP TRUCKS

(71) Applicant: Darcy Peters, Fredericton (CA)

(72) Inventor: Darcy Peters, Fredericton (CA)

( * ) Notice: Subject to any disclaimer, the term of this patent is extended or adjusted under 35 U.S.C. 154(b) by 0 days.

(21) Appl. No.: 13/694,131

(22) Filed: Nov. 1, 2012

(65) Prior Publication Data

US 2013/0134733 A1 May 30, 2013

Related U.S. Application Data

(60) Provisional application No. 61/629,826, filed on Nov. 29, 2011.

(51) Int. Cl.
*B60R 9/00* (2006.01)
*B60P 1/43* (2006.01)
*B62D 33/04* (2006.01)

(52) U.S. Cl.
CPC ............... *B62D 33/04* (2013.01); *B60P 1/435* (2013.01)
USPC ........................................ 296/37.6; 296/61

(58) Field of Classification Search
USPC .................................................. 296/37.6, 61
See application file for complete search history.

(56) References Cited

U.S. PATENT DOCUMENTS

| | | |
|---|---|---|
| 3,068,038 A | 12/1962 | Douglass, Jr. |
| 3,245,713 A | 4/1966 | Ogilvie |
| 3,326,595 A | 6/1967 | Ogilvie |
| 3,737,058 A | 6/1973 | Johnson |
| 4,475,761 A | 10/1984 | Milroy et al. |
| 4,944,546 A | 7/1990 | Keller |
| 4,990,049 A * | 2/1991 | Hargrove ...................... 414/537 |
| 5,150,939 A | 9/1992 | Simin |
| 5,303,969 A | 4/1994 | Simnacher |
| 5,567,000 A | 10/1996 | Clare |
| 5,615,922 A | 4/1997 | Blanchard |
| 5,772,271 A | 6/1998 | Sanders |
| 5,823,598 A | 10/1998 | Clare |
| 5,848,818 A | 12/1998 | Flueckinger |
| 5,934,727 A | 8/1999 | Storc et al. |
| 6,003,923 A | 12/1999 | Scott |
| 6,007,128 A * | 12/1999 | Hines, Jr. ...................... 296/37.6 |
| 6,007,129 A | 12/1999 | Kearney, Jr. |
| 6,099,233 A | 8/2000 | Craik |
| 6,102,474 A | 8/2000 | Daley |
| 6,430,769 B1 * | 8/2002 | Allen ............................. 14/69.5 |
| 6,481,604 B1 | 11/2002 | Beene et al. |
| D473,839 S | 4/2003 | Atencio |
| 6,634,848 B2 * | 10/2003 | Henderson .................... 414/537 |
| D487,720 S | 3/2004 | Thomas |
| 7,481,014 B2 * | 1/2009 | Milburn ......................... 40/724 |
| 7,488,025 B1 | 2/2009 | Roberson |
| 2005/0052045 A1 | 3/2005 | Juzwiak |

* cited by examiner

*Primary Examiner* — Dennis H Pedder
*Assistant Examiner* — Beverly Becker
(74) *Attorney, Agent, or Firm* — Mario Theriault

(57) ABSTRACT

The tailgate storage case assembly is made of an elongated hollow storage compartment having a closed front end and an open rear end. A pivot bracket is mounted to the storage compartment near the front end for supporting the front end to the sidewall of a pickup truck box. The pivot bracket has a pivot joint therein for allowing an angular displacement of the hollow storage compartment about the pivot joint. The storage case assembly also includes a latch bracket mounted to the storage compartment near the rear end thereof for supporting the rear end to the sidewall. The latch bracket has a slide surface thereon for allowing the rear end of the hollow storage compartment to be displaced toward and away from the sidewall to define a clearance between a ramp being stowed in the storage case assembly and the tailgate post of the pickup truck.

12 Claims, 2 Drawing Sheets

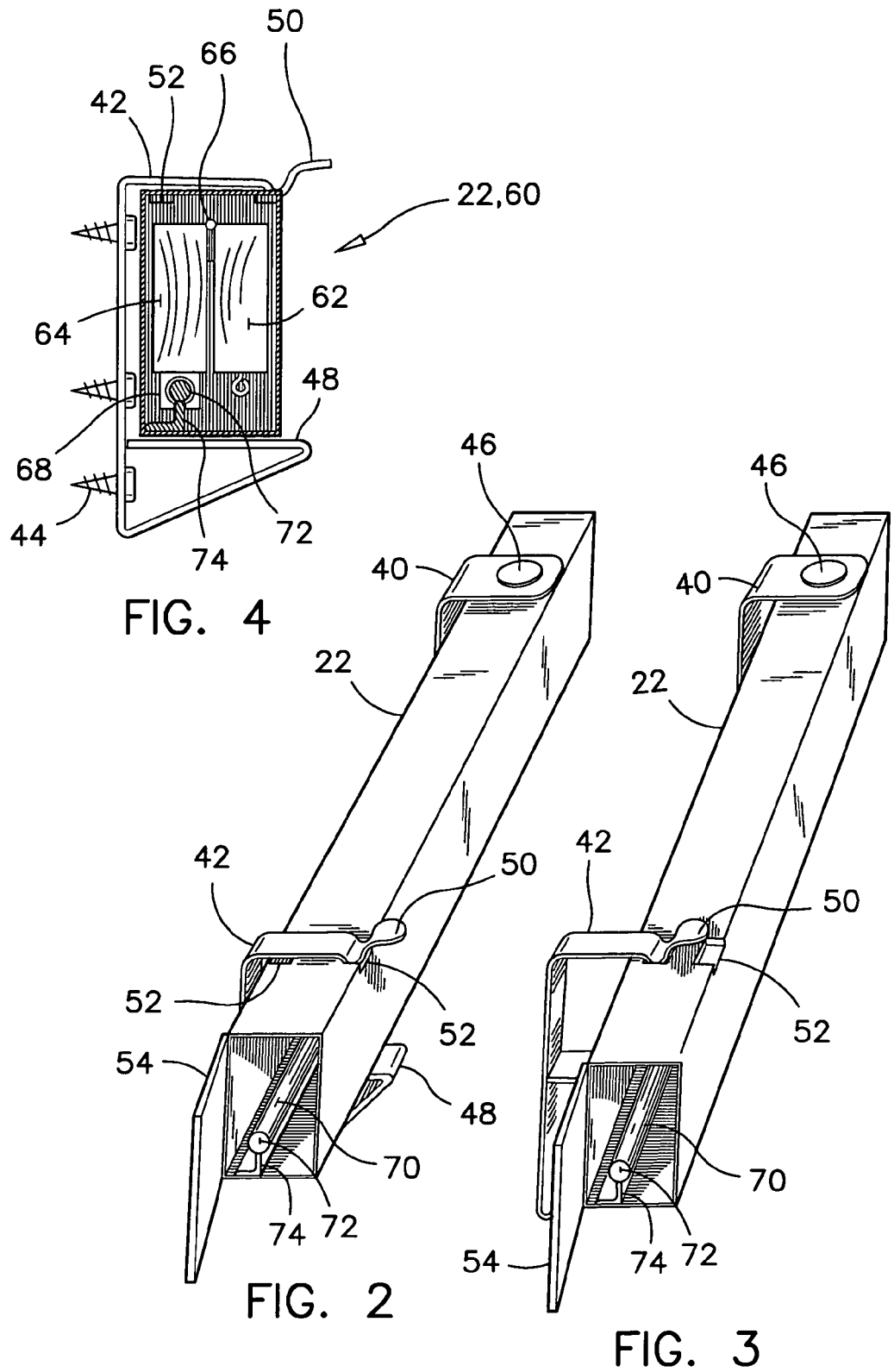

RAMP STORAGE CASE ASSEMBLY FOR PICKUP TRUCKS

This application claims the benefit of U.S. Provisional Patent Application No. 61/629,826, filed Nov. 29, 2011.

FIELD OF THE INVENTION

This invention pertains to ramps for pickup trucks, and more particularly, it pertains to ramp storage compartments and storage cases mounted to the sidewalls of a truck box.

BACKGROUND OF THE INVENTION

Pickup trucks are used to transport lawnmowers, tillers, snow blowers, wheelbarrows, snowmobiles, motorcycles and off-road vehicles of all types. Tailgate ramps are used to load these vehicles and equipment into the truck box. Between uses, these ramps are often precariously laid into the truck box where they can fall off the truck and become lost on the highway, or where they can move around inside the truck box and damage the equipment being transported. Because of these inconveniences, a need has been recognized for stowing or otherwise retaining tailgate ramps in an orderly manner inside a pickup truck.

The prior art contains several models of storage compartments incorporated in the sidewalls or in the floor of a truck box. Examples of these storage compartments are listed below:

U.S. Pat. No. 3,068,038 issued to C. C. Douglass, Jr., on Dec. 11, 1962;
U.S. Pat. No. 3,245,713 issued to D. A. Ogilvie on Apr. 12, 1966;
U.S. Pat. No. 3,326,595 issued to D. A. Ogilvie on Jun. 20, 1967;
U.S. Pat. No. 3,737,058 issued to J. E. Johnson on Jun. 5, 1973;
U.S. Pat. No. 4,475,761 issued to A. G. Milroy et al., on Oct. 9, 1984;
U.S. Pat. No. 5,303,969 issued to L. W. Simnacher on Apr. 19, 1994;
U.S. Pat. No. 5,615,922 issued to R. W. Blanchard on Apr. 1, 1997;
U.S. Pat. No. 5,848,818 issued to G. D. Flueckinger on Dec. 15, 1998;
U.S. Pat. No. 5,567,000 issued to S. Clare on Oct. 22, 1996;
U.S. Pat. No. 5,772,271 issued to J. F. Sanders on Jun. 30, 1998;
U.S. Pat. No. 5,823,598 issued to S. Clare et al., on Oct. 20, 1998;
U.S. Pat. No. 6,003,923 issued to G. M. Scott et al., on Dec. 21, 1999;
U.S. Pat. No. 6,007,129 issued to J. M. Kearney Jr., on Dec. 28, 1999'
U.S. Pat. No. 6,102,474 issued to W. Daley on Aug. 15, 2000;
U.S. Pat. No. 6,099,233 issued to S. W. Craik on Aug. 8, 2000;
U.S. Pat. No. 6,481,604 issued to J. Beene et al., on Nov. 19, 2002;
U.S. Pat. D473,839 issued to D. Atencio on Apr. 29, 2003;
U.S. Pat. D487,720 issued to R. Thomas on Mar. 23, 2004;
US Patent Appl. 2005/0052045 filed by R. Juzwiak on Mar. 17, 2004;
U.S. Pat. No. 7,488,025 issued to A. M. Roberson on Feb. 10, 2009.

Although several storage compartments have been found in the prior art, there is still a need for a better storage compartment that does not take away from the available space inside the truck box. There is also a need for a better storage case that is easily accessible when the truck box is loaded with a large all-terrain-vehicle (ATV) for example.

The useable floor space in a truck box is somewhat limited by the footprints of the wheel wells, and therefore, the space above the wheel wells is available for mounting storage compartments without compromising the clearance needed to drive an ATV in and out of the truck box.

In order to further minimize the space taken by storage compartments in a truck box, it is advantageous to install these compartments as closes as possible from the sidewalls of the box, and more preferably, it is advantageous to install these compartments inside the available hollow spaces in the sidewalls, between the framing members of the sidewalls. It is believed that the prior art compartments do not fulfill these requirements. Because of this deficiency basically, it is believed that the storage compartments of the past have experienced a limited commercial success.

Therefore, it is believed that there is a need for a better tailgate ramp storage case to be offered for sale as an aftermarket accessory, for mounting inside the hollow space in the sidewall of a truck box.

SUMMARY OF THE INVENTION

In the present invention, there is provided a ramp storage compartment that can be mounted inside the hollow space in the sidewall of a truck box, under the rim of the box The storage compartment is supported on a pivot at its front end and on a slide at its rear end such that the rear end can be swung in, clear of the tailgate framing post.

In a first aspect of the present invention, there is provided, a tailgate storage case assembly that is made of an elongated hollow compartment having a closed front end and an open rear end. A pivot bracket is mounted to the compartment near the front end for supporting the front end. The pivot bracket has a pivot joint therein for allowing the hollow compartment to move about the pivot joint. The storage case assembly also includes a latch bracket mounted to the compartment near the rear end thereof for supporting the rear end. Each of the pivot bracket and the latch bracket has a vertical surface for attachment to a sidewall of a pickup truck, and for supporting the compartment to the sidewall of the pickup truck. The latch bracket has a slide surface thereon for allowing the rear end to be swung toward and away from the sidewall, about the pivot joint. The hollow compartment further has a rail extending therein along a full length thereof. The tailgate ramp has a guide thereon and this guide can be engaged over the aforesaid rail for securely stowing the ramp into the hollow compartment.

In another aspect of the present invention, the latch bracket has a latch thereon and the storage compartment has recesses in its surface for engagement of the latch in one of the recesses when the compartment is swung toward or away from the sidewall. In use, the rear end of the hollow compartment is swung out from the sidewall. Between uses, the hollow compartment is pushed back in the available hollow space of the sidewall and locked in place by the engagement of the latch member in one of the recesses in the surface of the compartment. Between uses the ramp storage case is held in the available hollow space of the sidewall, under the rim of the box, deeper than the rim and the tailgate framing post.

This brief summary has been provided so that the nature of the invention may be understood quickly. A more complete understanding of the invention can be obtained by reference to the following detailed description of the preferred embodiment thereof in connection with the attached drawings.

BRIEF DESCRIPTION OF THE DRAWINGS

A preferred embodiment of the present invention is illustrated in the accompanying drawings, in which like numerals denote like parts throughout the several views, and in which:

FIG. 2 is a perspective view of the preferred storage case assembly in a first position;

FIG. 3 is a perspective view of the preferred storage case assembly in a second position;

FIG. 4 is a cross-section view of the preferred tailgate ramp in a folded mode and stowed inside the preferred case assembly.

DESCRIPTION OF THE PREFERRED EMBODIMENT

Figure 1:
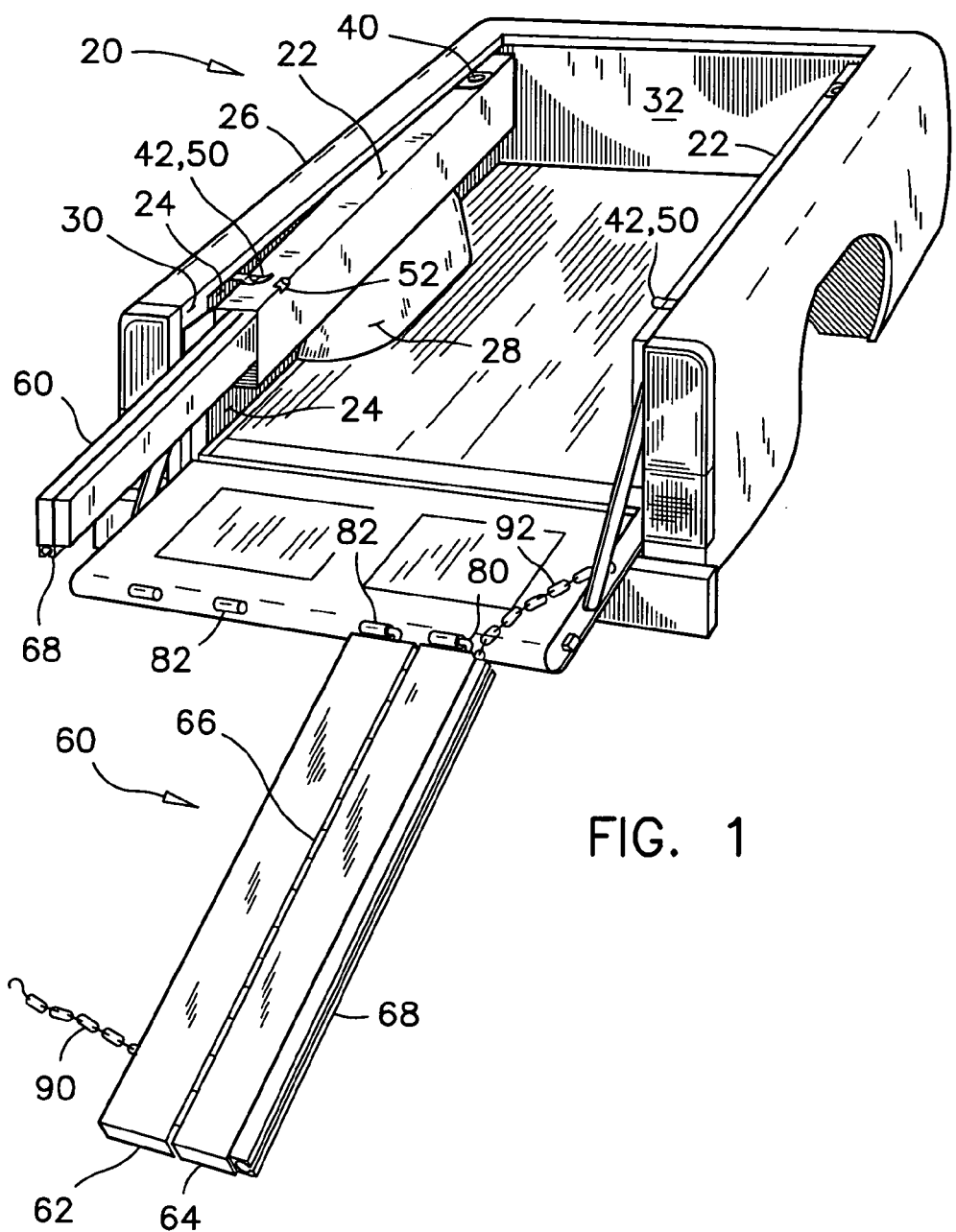
FIG. 1 is a perspective view of a pickup truck box showing a left side ramp storage case assembly according to the preferred embodiment of the present invention.

Referring to the drawings in FIGS. 1-4, the preferred truck box 20 in which the preferred storage case assemblies 22 are installed has hollow spaces 24 in the sidewalls 26 thereof, above the wheel wells 28, and under and deeper than the rim of the box. These hollow spaces 24 are referred to herein as available hollow spaces. The preferred ramp storage case assemblies 22 are mounted in these available spaces, between the tailgate framing posts 30 and the front wall 32 of the truck box.

For convenience, reference is made to the left side ramp storage case assembly. The right side storage case assembly is a mirror image and the installation and use thereof are a same as described herein. Also for convenience, reference numeral 22 is used commonly to designate the preferred storage case assembly and for the hollow storage compartment therein.

The preferred ramp storage case assembly has an elongated rectangular box-like storage compartment 22 that takes up basically the entire length available between the tailgate post 30 and the front wall 32 of the truck box. The storage compartment 22 is made of sheet metal, but other rigid material can also work as well. The ramp storage compartment 22 is held to the sidewall of the truck box in the available hollow spaces 24 of the sidewall, by means of a pivot bracket 40 mounted near the front end thereof, and a slide bracket 42 mounted near the rear end thereof. The pivot bracket 40 and the slide bracket 42 are affixed to the sidewall 26 of the truck box, by screws 44 for example.

The preferred ramp storage case assembly includes the hollow storage compartment 22, the pivot bracket 40, and the slide bracket 42.

These brackets 40, 42 can also be affixed to the top rail along the sidewall, or to the wheel well, if one prefers. The pivot bracket 40 can be mounted at different locations along the front half of the preferred storage compartment, wherever it is more convenient. Similarly the slide bracket 42 can be mounted along the rear half of the storage compartment 22, according to the type of pickup truck considered, the type of tailgate ramps used or according to the choice of the designer.

The pivot bracket 40 has a pivot joint 46 therein, as can be understood, for allowing the hollow storage compartment 22 to move about that joint 46 while the pivot bracket 40 itself remains fix to the sidewall 26 of the truck box.

The slide bracket 42 has a foot support 48 that is longer than the width of the storage compartment 22, for allowing the sliding of the rear end of the storage compartment 22 clear of the tailgate framing post 30. FIGS. 2 and 3 show the extend of movement of the preferred storage compartment 22 relative to the slide bracket 42.

Latches 50 are provided on the slide bracket 42 to selectively engage with one of at least two notches 52 in the upper wall of the storage compartment. Each latch 50 can be lifted out of engagement from a notch 52 to swing the rear end of the storage compartment 22 away from the sidewall, to remove a tailgate ramp 60 from the storage compartment 22 for example.

The slide bracket 42 is made of a stiff but resilient material such as spring steel so that the latch 50 has elastic properties to move up and down as needed, and to positively engage into one of the notches 52. Although the latch 50 is not essential, it is advantageous for ensuring an orderly and safe use of the ramp storage case assembly.

The rear end of the ramp storage compartment 22 needs only to be moved the thickness of the tailgate framing post 30, so that the ramp 60 can be taken out of the storage compartment 22.

A hinged cover 54 is optionally provided on the end of each hollow storage compartment 22. This cover 54 is advantageously positioned substantially as illustrated, to protect the tailgate post 30 and any accessory such as a taillight housing associated with the tailgate post 30, from damage.

Each of the ramps 60 to be use with the preferred storage case assembly is made of two elongated halves 62, 64 that are fastened to each other on a piano hinge 66 for example. One of the halves 62 has a rigid guide tube 68 affixed to it. The guide tube 68 has a slot there along. The tube 68 is preferably made of steel. The ramp halves 62, 64 can be made of wood, metal or plastic with sufficient safety factor to support the intended loads.

Each ramp storage compartment 22 has a rail 70 mounted therein. The rail 70 is made of a round metal rod 72 welded to one leg of a structural angle 74. The rod 72 and structural angle 74 are preferably made of steel or aluminum.

Between uses, both halves 62, 64 of each ramp are folded over each other about the piano hinge 66 and inserted in the storage compartment 22, with the slotted guide tube 68 being engaged over the rail 70. The guide tube 68 slides over the round rod 72 and the slot of the tube slides along the leg of the structural angle 74 supporting the round rod 74. The purpose of the rail 70 is to evenly support the ramps 60 along the storage compartment 22.

The ramp support rail 70 can also be located near the top or near the opposite side of its illustrated position, and have a shape other than cylindrical.

Although the guide tube 68 and rail 70 arrangement is not essential, this system is advantageous for holding the ramps 60 steady inside their respective storage compartments 22, for preventive relative movement of the ramps 60 inside the storage compartments 22.

The preferred ramp halves 62,64 have hooks 80 on their upper ends to engage with matching sleeves 82 mounted at appropriate locations on the truck's tailgate. Preferably, a chain and hook 90 and clamp are installed on one of the ramps to retain the bottom ends of the ramps at a proper distance from each other and to prevent lateral movement of the ramps in use.

Another chain 92 is preferably installed on the front end of each ramp 60 as a safety feature to retain each ramp to the tailgate of the truck box.

As to the construction and use of the ramp storage case assembly according to the preferred embodiment of the present invention, these details should be apparent to those skilled in the art, and accordingly, further description relative to these aspects is deemed unnecessary.

What is claimed is:

1. A storage case assembly, comprising;
   an elongated hollow storage compartment having a closed front end and a rear end;
   a pivot bracket mounted to said storage compartment near said front end for supporting said front end thereto; said pivot bracket having a pivot joint therein for allowing said storage compartment to swing about said pivot joint;
   a latch bracket mounted to said storage compartment near said rear end for supporting said rear end thereto;
   each of said pivot bracket and said latch bracket having a vertical surface for attachment to a sidewall of a pickup truck, and for supporting said storage compartment to said sidewall of a pickup truck;
   said latch bracket having a slide surface thereon for allowing said rear end to be swung toward and away from said sidewall about said pivot joint; and
   said hollow storage compartment having a rail extending therein along a full length thereof, and a tailgate ramp stowed therein, said tailgate ramp having a guide tube engaging said rail.

2. The storage case assembly as claimed in claim 1, wherein said latch bracket has a latch thereon and said storage compartment has notches therein for engagement of said latch in one of said notches when said storage compartment is displaced toward or away from said sidewall.

3. The storage case assembly as claimed in claim 1, further including a hinged cover on said rear end thereof.

4. In combination, a pickup truck; a storage case assembly mounted to the sidewall of a box of said pickup truck, in a hollow space in said sidewall, and a tailgate ramp stowed in said storage case assembly;
   said storage case assembly comprising;
   an elongated hollow storage compartment having a closed front end and a rear end;
   a pivot bracket mounted to said storage compartment near said front end and to said sidewall for supporting said front end to said sidewall; said pivot bracket having a pivot joint in said pivot bracket for allowing a movement of said storage compartment about said pivot joint;
   a latch bracket mounted to said storage compartment near said rear end and to said sidewall for supporting said rear end to said sidewall;
   said latch bracket having a slide surface thereon for allowing said rear end to be displaced toward and away from said sidewall, about said pivot joint, and
   said hollow storage compartment further having a rail extending therein along a full length thereof, and said tailgate ramp has a guide tube engaging said rail.

5. The combination as claimed in claim 4, wherein said latch bracket has a latch thereon and said storage compartment has notches therein for engagement of said latch in one of said notches when said storage compartment is displaced toward or away from said sidewall.

6. The combination as claimed in claim 4, wherein said pivot bracket and said latch bracket are affixed to said sidewall by means of screws.

7. The combination as claimed in claim 5, wherein said latch bracket is made of spring steel.

8. The combination as claimed in claim 5, further including a hinged cover on said rear end.

9. The combination as claimed in claim 4 wherein said tailgate ramp is made of two elongated halves joined together by a piano hinge.

10. The combination as claimed in claim 9, wherein said rail is a round rod and said guide tube is a slotted tube.

11. The combination as claimed in claim 9, wherein said tailgate ramp comprises a first safety chain extending from a first end thereof.

12. The combination as claimed in claim 11, wherein said tailgate ramp comprises a second safety chain extending from a second end thereof.

* * * * *